US010072546B2

(12) United States Patent
Bencosme Ferreras et al.

(10) Patent No.: US 10,072,546 B2
(45) Date of Patent: Sep. 11, 2018

(54) AUTOMATICALLY HEATED CATALYTIC CONVERTER

(71) Applicant: INSTITUTO TECNOLOGICO DE SANTO DOMINGO, Santo Domingo (DO)

(72) Inventors: Francarlos Bencosme Ferreras, Santo Domingo (DO); Keyron Figueroa Guichardo, Santo Domingo (DO)

(73) Assignee: Instituto Tecnologico De Santo Domingo, Santo Domingo (DO)

( * ) Notice: Subject to any disclaimer, the term of this patent is extended or adjusted under 35 U.S.C. 154(b) by 7 days.

(21) Appl. No.: 15/128,188

(22) PCT Filed: Aug. 17, 2015

(86) PCT No.: PCT/DO2015/000003
§ 371 (c)(1),
(2) Date: Sep. 22, 2016

(87) PCT Pub. No.: WO2016/026502
PCT Pub. Date: Feb. 25, 2016

(65) Prior Publication Data
US 2017/0101915 A1 Apr. 13, 2017

(30) Foreign Application Priority Data

Aug. 18, 2014 (DO) .............................. U2014-0190

(51) Int. Cl.
F01N 3/10 (2006.01)
F01N 3/20 (2006.01)
(Continued)

(52) U.S. Cl.
CPC .......... F01N 3/2026 (2013.01); B01D 53/94 (2013.01); B01D 53/9454 (2013.01); B01J 35/04 (2013.01); F01N 3/10 (2013.01); F01N 3/101 (2013.01); F01N 3/103 (2013.01); F01N 3/106 (2013.01); F01N 3/2013 (2013.01); F01N 3/28 (2013.01); F01N 3/2892 (2013.01); F01N 9/00 (2013.01); F01N 13/0097 (2014.06); B01D 2255/1021 (2013.01); B01D 2255/1023 (2013.01); B01D 2255/1025 (2013.01);
(Continued)

(58) Field of Classification Search
CPC .......... F01N 3/2026; F01N 3/10; F01N 3/103; F01N 3/106; F01N 3/28
USPC ........................................ 422/174, 177, 180
See application file for complete search history.

(56) References Cited

U.S. PATENT DOCUMENTS

| 4,516,993 A * | 5/1985 | Takeuchi | B01D 46/0063 422/178 |
| 5,569,455 A * | 10/1996 | Fukui | B01D 53/945 422/174 |
| 2012/0186447 A1 * | 7/2012 | Hodgson | F01N 3/0275 95/79 |

FOREIGN PATENT DOCUMENTS

CN 201344054 Y * 11/2009

* cited by examiner

Primary Examiner — Thanh P Duong
(74) Attorney, Agent, or Firm — Defillo & Associates, Inc; Evelyn Defillo

(57) ABSTRACT

The present invention is based on the application of heating resistors by a temperature regulation circuit in certain points of the catalyzer so that this comes into operation in the least time possible, reducing most of the amount of low molecular stability or environmentally harmful substances. Likewise, little tumult are added to each monolith duct to raise exhaust gas turbulence and increase the contact between the reduction and oxidation agent, whether it be platinum, palladium and rhodium.

6 Claims, 5 Drawing Sheets

(51) Int. Cl.
  *B01D 53/94*   (2006.01)
  *B01J 35/04*   (2006.01)
  *F01N 3/28*    (2006.01)
  *F01N 9/00*    (2006.01)
  *F01N 13/00*   (2010.01)

(52) U.S. Cl.
  CPC .. *B01D 2257/404* (2013.01); *B01D 2257/502* (2013.01); *B01D 2257/702* (2013.01); *B01D 2258/01* (2013.01); *F01N 2240/16* (2013.01); *F01N 2240/20* (2013.01); *F01N 2570/10* (2013.01); *F01N 2570/12* (2013.01); *F01N 2570/14* (2013.01); *Y02T 10/22* (2013.01); *Y02T 10/26* (2013.01); *Y02T 10/47* (2013.01)

AUTOMATICALLY HEATED CATALYTIC CONVERTER

CROSS REFERENCE TO RELATED APPLICATION

This application is a national stage entry of PCT/DO2015/000003 filed Aug. 17, 2015, under the International Convention claiming priority over Dominican Republic Patent Application No. U2014-0190 filed Aug. 18, 2014.

FIELD OF THE INVENTION

The present invention relates to the catalytic converters implemented in vehicles with internal combustion engines (7) that make low molecular stability particles and polluters such as carbon monoxide, unburnt hydrocarbons, sulfur and nitrogen oxide react in order to recombine them in harmless particles to the environment. The utility model entirely relates to the device or catalytic converter implementing onto it an automatic temperature control circuit (1) and heat resistance to accelerate the speed of the reactions.

BACKGROUND OF THE INVENTION

Catalysts are substances that vary the speed of a chemical reaction without being consumed therein. Once a chemical reaction has been produced the catalyzer is recovered unaltered; therefore, the catalyzer does not disrupt the processes that ought to be a balance chemical situation. It only varies the speed in which the balance is achieved.

The catalytic converter is a post treatment device for exhaust gasses with aims to take low molecular stability gasses, which are harmful to humans and the environment, to convert them in high molecular stability products and with almost no reactivity in normal pressure and temperature conditions.

The inner workings of catalyzer is based in two chemical reactions which are oxidation and reduction. The oxidizing reactions react by means of the platinum-palladium and the reduction action by means of the platinum-rhodium. Before leaving onto the atmosphere exhaust gasses go through a catalyzer, where polluters are eliminated through a chemical process and become harmless substances present in the atmosphere such as Nitrogen, water and carbon dioxide. Exhaust gasses are forced to go through the interior in a turbulent flow, thus achieving a better contact between gasses and the precious metals of the catalytic converter, thus improving the conditions for a transfer of masses and elevating the conversion efficiency.

The catalytic converter is mounted on the exhaust pipe, immediately after the exhaust collector for gasses maintain a high temperature there. This heat energy goes through the catalyzer and raises its own temperature, paramount circumstance to achieve maximum performance in this device, which reaches the 400° and 700° centigrade.

As the exhaust gasses go through the catalyzer, they react with the precious metal covering and transform in inert gasses such as water vapor, Nitrogen and carbon dioxide, less harmful to health.

The actions that each catalytic metal performs in the system are as follows:

Rhodium

It's responsible of NOx (nitrogen oxide) decomposition into oxygen and nitrogen, harmless particle that are natural components of the atmosphere.

Palladium

This metal is a catalyzing oxidant, which acts upon CO (carbon monoxide) particles breaking their saturated bond due to high temperature in CO2 (carbon dioxide), harmless particles to the general public, but these at the same time tend to retain the sun's ultraviolet rays, causing global warming.

Platinum

Oxidizing metal, this one is implemented to break the saturated combinations of CO and of the unburnt hydrocarbons in order to turn them into more oxygen, water vapor and carbon dioxide.

Currently there are vehicle catalyzers that reduce polluting gasses, but these begin to work after the vehicle has run a considerable distance in order to achieve the needed working temperature, this is a heat-journey relation that is directly proportional to the environment temperature of the time, and therefore, depending the position one might be regarding the developed temperature in said place will be the time that could further prolong the distance required to reach the temperature. For instance, the current catalytic converters might take 8 to 15 mins or a 10 km journey, which at the time is an irrelevant thing, but factoring approximately 1000 million vehicles that day after day turn their engine (7), the amount of toxic gasses that are directly released into the atmosphere would be approximately 10,000 km daily (assuming that every vehicle has catalyzers).

The original system of the vehicle catalytic converter works in high temperature as the exhaust gasses that go through the monolith and transmit their heat based on conduction. If this metals that undertake the catalytic work are not in a temperature range above the 400° C. they become useless. A normal vehicle takes 10 km or 15 mins after having started the combustion engine (7) which makes the vehicle expel untreated exhaust gasses. The pollution emitted in the timeframe is subject to the temperature the catalyzer has at the time the engine (7) is started and taking into consideration the amount of vehicles the run daily around the world (1000 million approximately), it is an excessive pollution and that can be avoided.

The automatic heating catalyzer (2) of this invention reduces that timeframe by implementing heat resistors directly on the monolith, which leads to having the catalytic converter take approximately a kilometer to reach working temperature which optimizes it in over 90%.

SUMMARY OF THE INVENTION

The object of the present invention is to provide a catalytic converter that reduces vehicle gas emitted pollution in a shorter time compared to the existing state of the art ones.

The automatic heat catalyzer (2) of this invention, bases its functioning completely in the catalysis reached through three precious metals: palladium, rhodium and platinum. In other words, the key functioning that makes it a catalytic converter as the ones that currently exist does not change, expect for the lower heating time that this new catalyzer possess.

Current converter reach their working temperature through the heat transmitted by the gas or smoke emitted by the engine (7) on high temperatures, a working temperature that is placed between 400° C. and 700° C. This makes it take 10 km or 15 mins journey approximately (it could be longer or shorter depending on the environment temperature to which the catalytic converter is subject) and there lays the innovation of our utility model.

Through strategic implementation of heat resistors the automatic heating catalyzer (2) reaches its working temperature in 1 km approximately (this is subject to environment changes), reducing 90% of vehicle emitted contamination. At the time the vehicle stars the heating system comes into operation until the catalysts (platinum, rhodium and palladium) reach said temperature, at that time the system shuts off so that the smoke emitted by the engine (7) mechanically heats the cells in the interior of each monolith of the aforementioned automatic heating catalyzer (2).

BRIEF DESCRIPTION OF THE DRAWINGS

To further clarify the invention and its advantages compared to the known art, the attached Figures are hereby described.

DETAILED DESCRIPTION OF THE INVENTION

Figure 3:
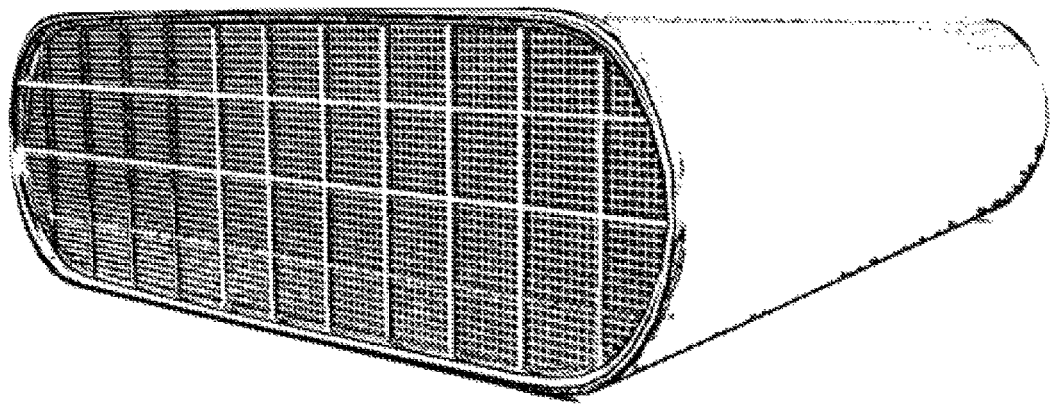
FIG. 3 is a representation of the main resistors (3) of the automatic heating catalyzer, which are placed as transversal lines within the monolith in 10 mm² squares each on, but this may vary depending on needed applications.
Figure 4:
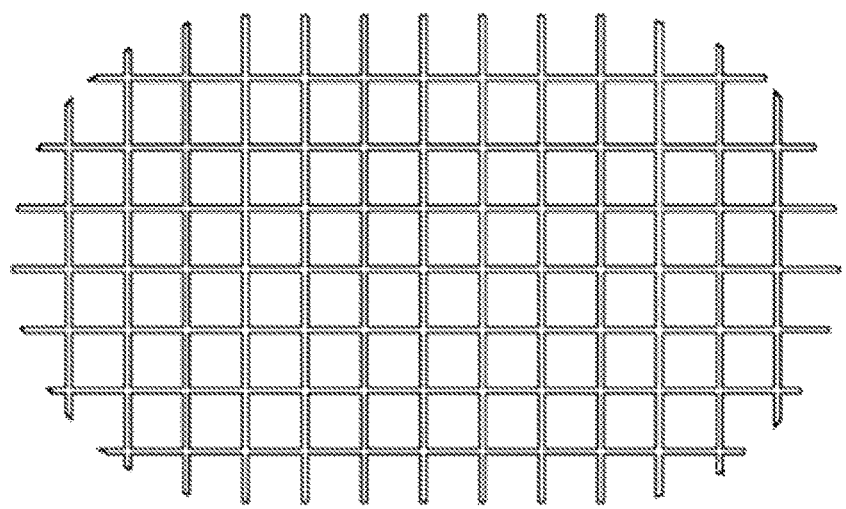
FIG. 4 is the direct representation of the internal heating resistors added to the monoliths (3) to reduce the temperature gradient, making the heating task more efficient.

Our new catalytic converter, the automatic heating catalyzer (2) immediately the vehicle starts will commence to go into operation, reducing the direct pollution time up to a 90%. The essential is that the catalysts reach the working temperature regularly. Our device integrates heating resistors within the catalytic converter's monoliths in the shape of transversal lines along and across the monolith as it is illustrated by FIGS. 3 and 4. These lines, given their transversal nature among them, tend to form 100 mm² squares each with a 0.05 mm line thickness with a 10 mm between margins for tolerance. The way to implement the internal heat resistors in that way, is because it is sought to increase the temperature gradient by reducing the time it takes for the resistors to heat their corresponding square. In other words, this way the heating area by square section is reduced thus increasing the heating efficiency and therefore the temperature gradient.

Figure 6:
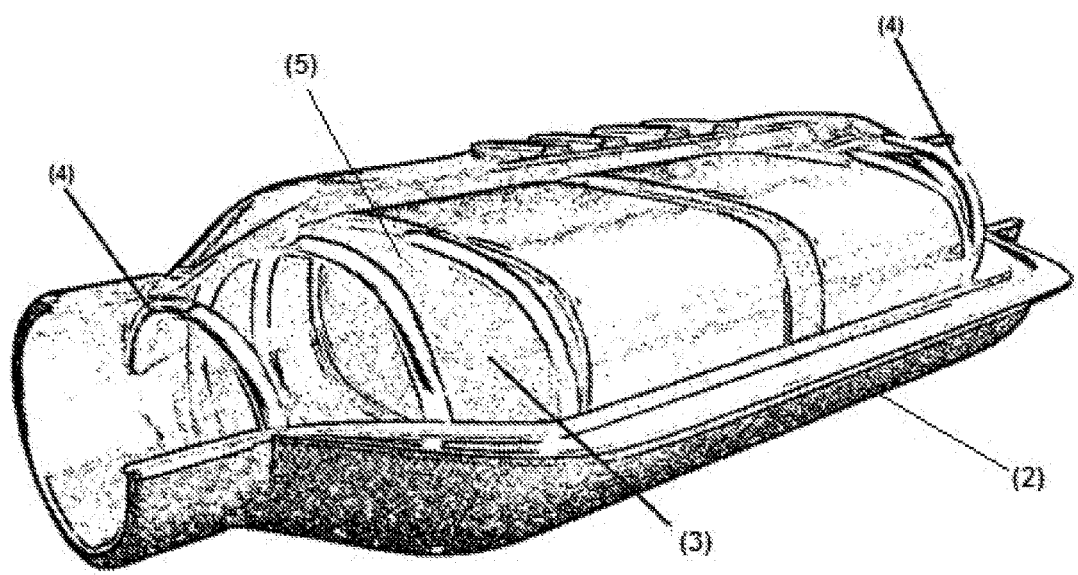
FIG. 6 is a representation that shows the location of the secondary heat resistors (4) in the shape of aureal spirals in the front and in the space that separates the first monolith from the second in the automatic heating catalyzer (2).

The resistors external to the monolith are installed in the front of the catalytic converter in an aureal spiral fashion, these are implemented from the entrance of the catalyzer to the frontal surface of the first monolith and on the separation of the first and second monolith in such a case as the catalytic converter is a three-way one, as illustrated by FIG. 6. In the event that said catalytic converter is only a two-way one, the spiral resistors are only installed in the frontal part of the monolith. This resistors external to the monolith are installed in order to optimize the gas flow within the engine (7) and the catalytic converter. Since the gas is heating up, temperature and the speed in which this travels increases, triggering the faster burn of untreated hydrocarbons and an inertial momentum that raises gas flow before entering the catalytic converter.

Each heating resistor is done with chrome-nickel alloy due to the high properties these kind of material possess with regards to thermic fields. Nickel and chrome also act together to resist oxidation, carbonization and other forms of high temperature deterioration. These alloys do not become brittle under cryogenic temperatures, they possess good resistance to traction and fatigue under moderate temperatures, and they present excellent flow and breakage resistance properties under high temperatures.

In each monolith duct (ceramic support) of this catalytic converter small tumults or elevations are placed that generate more turbulence within it, making it so there is a faster mechanical heating up and a better catalysis, due to the fact that the gas has more contact with the surface that is impregnated with the noble metals, improving the heat up speed. Each tumult (5) has a 0.01 mm² radius with a 0.00001 mm height with a 20 mm separation from one another, in the upper and lower part of the cell.

Figure 5:
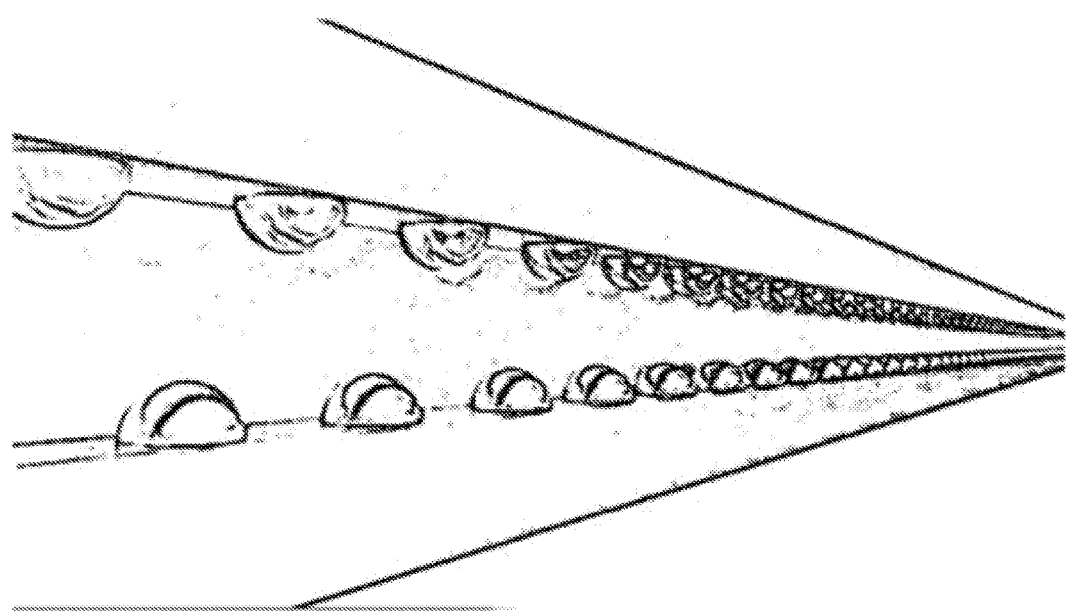
FIG. 5 is a representation of the modification made to each monolith duct in question. Said modification is based in small tumults (5) at a distance determined by the amount of turbulence needed to be elicited, taking in consideration that the more turbulence the more transmitted heat.

These tumult are subject to changes depending of the catalytic converter manufacturer, this because each industry has its own measurement for each monolith duct (see FIG. 5).

The electronic system along with the heating resistors are connected to the electric generator that the vehicle possesses. The most important functioning of this circuit is to establish an optimal temperature range so that the catalysts get the catalysis start up temperature which is around 400° C. to 450° C. as soon as possible. As soon as the catalysts reach that initial working temperature, the circuit will shut off normalizing the workings of the vehicle generator, but at any time in which said catalysts due to climate changes of the environment in which they are found their temperature begin to descend, the circuit will detect it and will come into operation again.

The automatic heating catalyzer (2), could not only be used in vehicles, but also in industries that pollute the environment using internal combustion engines (7) to order to obtain their energetic supply, using the same system for vehicles adapted to different scales, but also in the exhaust pipe of gas base electrical generators.

Figure 1:
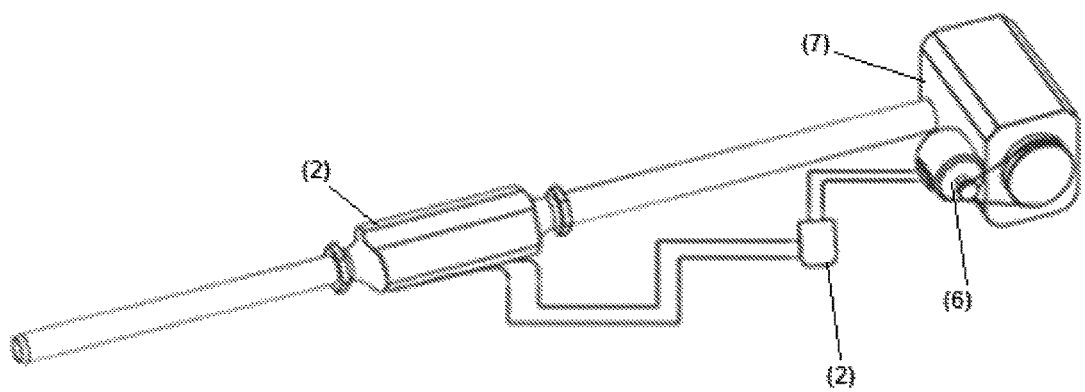
FIG. 1 shows the components that constitute the automatic heating catalyzer (2). It shows how to install the automatic temperature control circuit (1) to the vehicle alternator (6) which will only be energized when the combustion engine (7) comes into operation and stars spewing polluting particles which will go to the automatic heating catalyzer (2) which will reduce polluting gasses.
Figure 2:
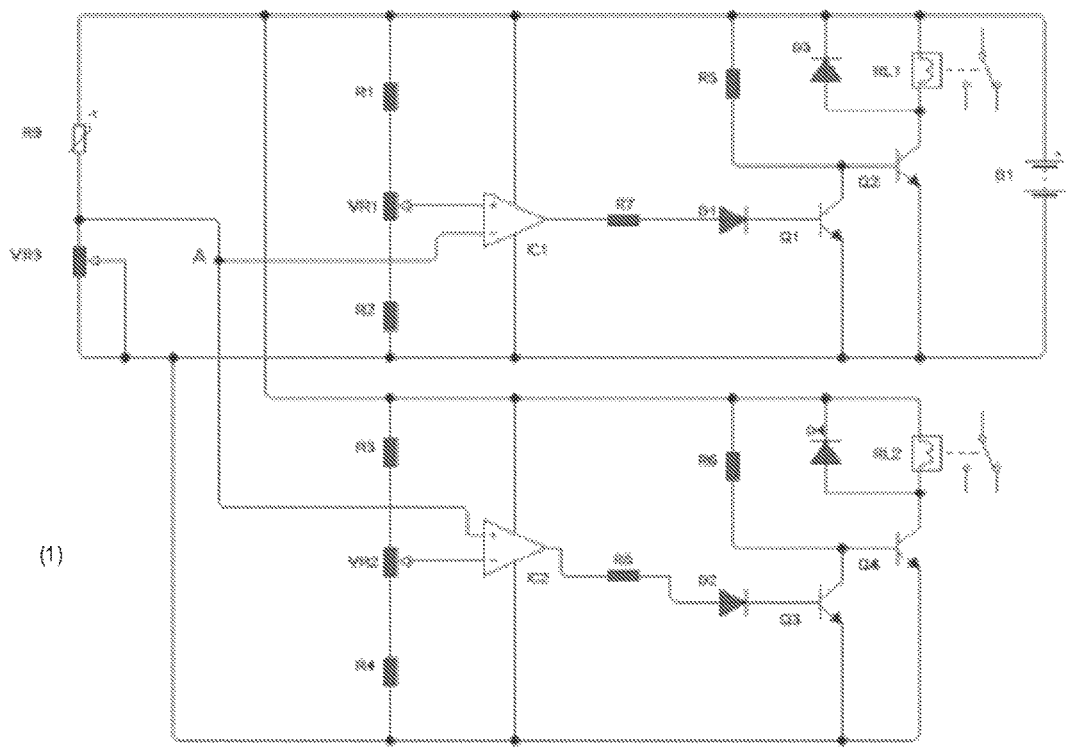
FIG. 2 is a diagram of the internal structure of the temperature control circuit (1). This performs the turning on and off of the heating resistors.

The automatic heating catalyzer (2), presents an automatic heat control circuit (1) of a 12V DC voltage so that it can be connected with a regulator directly to the alternator of the vehicle. If we apply a reference voltage to the converter input given by the resistor division R3-R4 as shown in FIG. 2, the output voltage could vary between 0 V and 9 V, approximately in the following conditions: when the voltage applied in the non-converter input (coming from the sensor) is less than the reference voltage, the output tension will be practically null. When the voltage in the non-converter input is greater than the reference voltage, the output voltage will be practically 9 V. the transition between those two voltages is so pronounced due to the elevated gain of the operational amplifier in the order of the 100,000 times.

In the output of the operational connected so, if we couple a PNP driver its conduction will occur precisely when the voltage is close to zero, while if it were a NPN transistor, this will conduct when the output voltage of the operational reaches the 9 V.

Placing two NPN transistors in cascade, with the intent to be able to control bigger loads, now the second transistor conducts when the first one is open and this condition happens when the voltage drops below the reference level. Thus, in this configuration the output transistor will conduct, activating the relay when the voltage given by the circuit in which the sensor is placed is lower than the reference voltage.

Taking into consideration that a sensor connected in the way shown in FIG. 2, with a negative temperature coefficient (NTC), drops the input voltage when the temperature "lowers" that is to say that the voltage of the thermistor rises and therefore the input voltage lowers. This circuit operates as a set off by "sub" temperature, that is, the relay RL2 is activated when the temperature drops below 385° C. of the t1 temperature where the heating process of the catalyzer restarts.

Moreover, we apply the reference voltage on the non-converter input (+) and the sensor voltage on the converter input. Likewise, given the gain of the operational amplifier, we have a very fast transition in its output, when one value surpasses the other.

Thus when the non-converter input voltage (circuit in which the sensor is located) surpasses that of the reference, the output voltage will drop to zero and the RL1 relay will activate. Since we also connected a driver with two cascading NPN transistors in the output, the conduction of the second transistor occurs when the tension drops to zero, which means that we have a setting off due to an excess in temperature, considering again the connection of the sensor with negative temperature coefficient (NTC). Thus, the temperature rises above the 420° C. t2, then the voltage on the thermistor drops, raising the input voltage of the first operational over the reference level, making it so that the output of said operational drops to 0 V, allowing the setting off of the RL1 relay, where the catalyzer refrigeration process restarts.

Summarizing, for temperature below 385° C. the RL2 is activated, which sets in motion a heating system and above 420° C. RL1 actives which sets in motion the cooling.

The invention claimed is:

1. An automatic heating catalyzer comprising:
a monolith catalytic converter;
heating resistors located inside the monolith catalytic converter, the heating resistors have a shape of transversal ribbons (3) placed along and across the inside of the monolith catalytic converter;
external heating resistors (4) in the shape of aureal spirals ribbons located in a front section of the monolith catalytic converter;
a plurality of bumps placed inside a duct of the monolith catalytic converter; and
an automatic temperature control system (1) connected to said heating resistors and the external heating resistors;
wherein the bumps are located at an upper section and a bottom section of the duct;
wherein the heating resistors are made of a chrome-nickel ally.

2. The automatic heating catalyzer according to claim 1, wherein the heating resistors are separated by a distance that is directly proportional to a size of the monolith catalytic converter with a standard measurement of 100 mm$^2$ of minimum tolerance.

3. The automatic heating catalyzer according to claim 1, wherein the tumults are present in an amount that is proportional to a length of the monolith.

4. The automatic heating catalyzer according to claim 1, wherein a working voltage of the automatic temperature control system (1) is of 12V DC and is connected with a regulator directly to an alternator (6) of a vehicle.

5. An automatic heating catalyzer comprising:
a monolith catalytic converter;
heating resistors located inside the monolith catalytic converter, the heating resistors have a shape of transversal ribbons (3) placed along and across the inside of the monolith catalytic converter;
external heating resistors (4) in the shape of aureal spiral ribbons located in a front section of the monolith catalytic converter;
a plurality of bumps placed inside a duct of the monolith catalytic converter; and
an automatic temperature control system (1) connected to said heating resistors and the external heating resistors;
wherein the bumps are located at an upper section and a bottom section of the duct and each bump has a 0.01 mm$^2$ radius with a 0.00001 mm height with a 20 mm separation from one another.

6. An automatic heating catalyzer consisting of:
a monolith catalytic converter;
heating resistors located inside the monolith catalytic converter, the heating resistors have a shape of transversal ribbons (3) placed along and across the inside of the monolith catalytic converter;
external heating resistors (4) in the shape of aureal spiral ribbons located in a front section of the monolith catalytic converter;
a plurality of bumps placed inside a duct of the monolith catalytic converter; and
an automatic temperature control system (1) connected to said heating resistors and the external heating resistors;
wherein the bumps are located at an upper section and a bottom section of the duct;
wherein the heating resistors are made of a chrome-nickel alloy.

* * * * *